United States Patent
Shamoto et al.

(10) Patent No.: US 6,756,698 B2
(45) Date of Patent: Jun. 29, 2004

(54) SWITCH DEVICE FOR VEHICLE

(75) Inventors: Noriyasu Shamoto, Aichi (JP); Norihito Saito, Aichi (JP); Hirokazu Shamoto, Aichi (JP); Katsushi Nagashima, Aichi (JP); Yutaka Suzuki, Aichi (JP); Masashi Sakurai, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 316 days.

(21) Appl. No.: 09/825,290

(22) Filed: Apr. 4, 2001

(65) Prior Publication Data

US 2001/0048246 A1 Dec. 6, 2001

(30) Foreign Application Priority Data

Apr. 4, 2000 (JP) .................................. P. 2000-101829

(51) Int. Cl.⁷ ............................................ B60R 25/04
(52) U.S. Cl. ..................... 307/10.6; 307/10.1; 74/473.3
(58) Field of Search .............................. 307/10.6, 10.1, 307/10.2; 74/473.3, 335; 477/99

(56) References Cited

U.S. PATENT DOCUMENTS

| | | | | |
|---|---|---|---|---|
| 5,441,022 A | * | 8/1995 | Yoder et al. .............. | 123/179.3 |
| 5,528,953 A | * | 6/1996 | Steinle et al. .............. | 74/473.3 |
| 6,237,378 B1 | * | 5/2001 | Canard ...................... | 70/252 |
| 6,295,887 B1 | * | 10/2001 | DeJonge et al. .......... | 74/473.3 |
| 6,389,856 B1 | * | 5/2002 | Watanuki et al. .......... | 70/186 |
| 6,500,092 B2 | * | 12/2002 | Syamoto ..................... | 477/99 |

FOREIGN PATENT DOCUMENTS

| | | |
|---|---|---|
| DE | 44 01 945 C1 | 3/1995 |
| DE | 197 47 269 A1 | 4/1999 |
| WO | 95/09748 | 4/1995 ........... B60R/25/04 |

* cited by examiner

Primary Examiner—Gregory J. Toatley, Jr.
Assistant Examiner—Roberto J. Rios
(74) Attorney, Agent, or Firm—Morgan, Lewis & Bockius LLP

(57) ABSTRACT

When a key is rotated, it is moved in order of an ON position, an R position, an N position and a D position so that the range of an automatic transmission is switched. Moreover, when the key 13 is pressed in the ON position and the N position, it is moved to a START position so that power is applied to a starter. In this case, it is possible to carry out an operation for starting an engine and an operation for switching the range of the automatic transmission by manipulating the same key in a different direction. Therefore, the operation for starting an engine and the operation for switching the range of the automatic transmission can be carried out easily.

4 Claims, 3 Drawing Sheets

SWITCH DEVICE FOR VEHICLE

BACKGROUND OF THE INVENTION

1. Technical Field of the Invention

The present invention relates to a switch device for a vehicle which is to be mounted on an automobile.

2. Related Art

For example, an automobile has such a structure that a steering column and a front floor are provided with an ignition switch device and a shift lever switch device. An engine is started based on the indirect operation of the ignition switch device through a key. A range of an automatic transmission is switched based on the direct manual operation of the shift lever switch device. With such a structure, it is necessary to individually and visually confirm the ignition switch device and the shift lever switch device, thereby individually carrying out an operation. Therefore, an operation for starting the engine and an operation for switching the range of the automatic transmission have been complicated.

SUMMARY OF THE INVENTION

In consideration of the circumstances, it is an object of the invention to provide a switch device for a vehicle capable of easily carrying out an operation for starting an engine and an operation for switching a range of an automatic transmission.

According to a first aspect of the invention, there is provided a switch device for a vehicle comprising:

an operating member provided rotatably and slidably;

a range switch for switching a range of an automatic transmission based on a rotation operation of the operating member; and a start switch for starting an engine based on a sliding operation of the operating member.

According to such structure, the engine is started based on the sliding operation of the operating member and the range of the automatic transmission is switched based on the rotating operation of the operating member. Therefore, the operation for starting the engine and the operation for switching the range of the automatic transmission can be carried out by manipulating the same operating member in a different direction. Consequently, it is easy to carry out the operation for starting the engine and the operation for switching the range of the automatic transmission.

According to a second aspect of the invention, in the switch device for the vehicle of the first aspect, the operating member, the range switch and the start switch is provided in a switch case.

According to a third aspect of the invention, in the switch device for the vehicle of the first aspect, the operating member is operated through a key which is insertable into the operating member.

According to a fourth aspect of the invention, there is provided a switch device for a vehicle comprising:

a switch case;

an operating member provided in the switch case;

a range switch, for switching a range of an automatic transmission based on an operation of the operating member, provided in the switch case;

a start switch, for starting an engine based on the operation of the operating member, provided in the switch case.

According to a fifth aspect of the invention, in the switch device for the vehicle of the fourth aspect, the range switch switches the range of the automatic transmission when the operating member is rotatably operated, the start switch starts the engine when the operating member is slidably operated.

According to a sixth aspect of the invention, in the switch device of the fourth aspect, the operating member is operated through a key which is insertable into the operating member.

BRIEF DESCRIPTION OF THE DRAWINGS

FIG. 1A is a sectional view showing the whole structure in a non-insertion state of a key and FIG. 1B is a sectional view showing the whole structure in an insertion state of the key)

DESCRIPTION OF PREFERRED EMBODIMENT

Figure 1A:
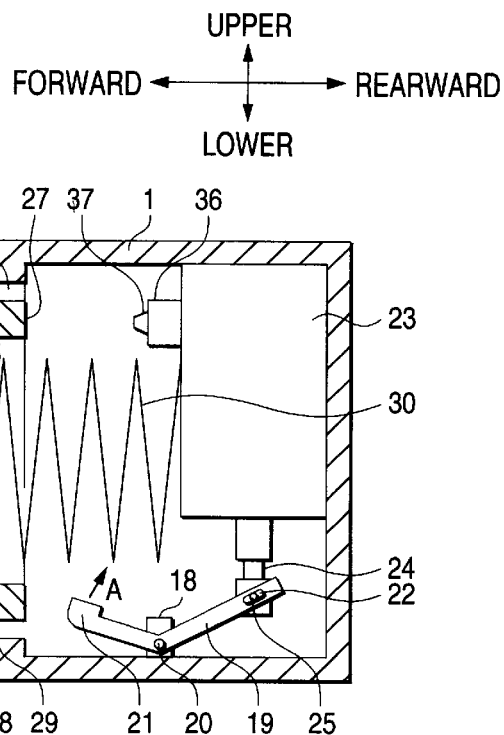
FIGS. 1A and 1B are views showing an embodiment of the invention.

An embodiment of the invention will be described below with reference to the drawings. A switch case 1 shown in FIG. 1A is to be fixed to a steering column of an automobile and has a cylindrical shape with a front face opened. A cylindrical key cylinder 2 corresponding to an operating member is fitted rotatably and slidably in the switch case 1, and a plurality of tumblers 3 are attached to the key cylinder 2 slidably in a vertical direction.

Two lock grooves 4 are formed on the inner peripheral surface of the switch case 1 and are positioned on a front end. A predetermined tumbler 3 is engaged with the inside of the upper lock groove 4 and the residual tumblers 3 are engaged with the inside of the lower lock groove 4. Each tumbler 3 is held in such a state as to be engaged with the inside of the lock groove 4 by the force of a spring (not shown).

A shift projection 5 is formed on the outer peripheral surface of the key cylinder 2 and is inserted in a shift groove 6. The shift groove 6 is formed on the inner peripheral surface of the switch case 1 and is constituted by first and second rotation operating portions 7 and 8 which are straight in the circumferential direction of the switch case 1, first and second start operating portions 9 and 10 which are extended straight in a longitudinal direction, and a U-shaped reverse operating portion 11 positioned between the first and second rotation operating portions 7 and 8 as shown in the expanded state of FIG. 2.

Figure 1B:
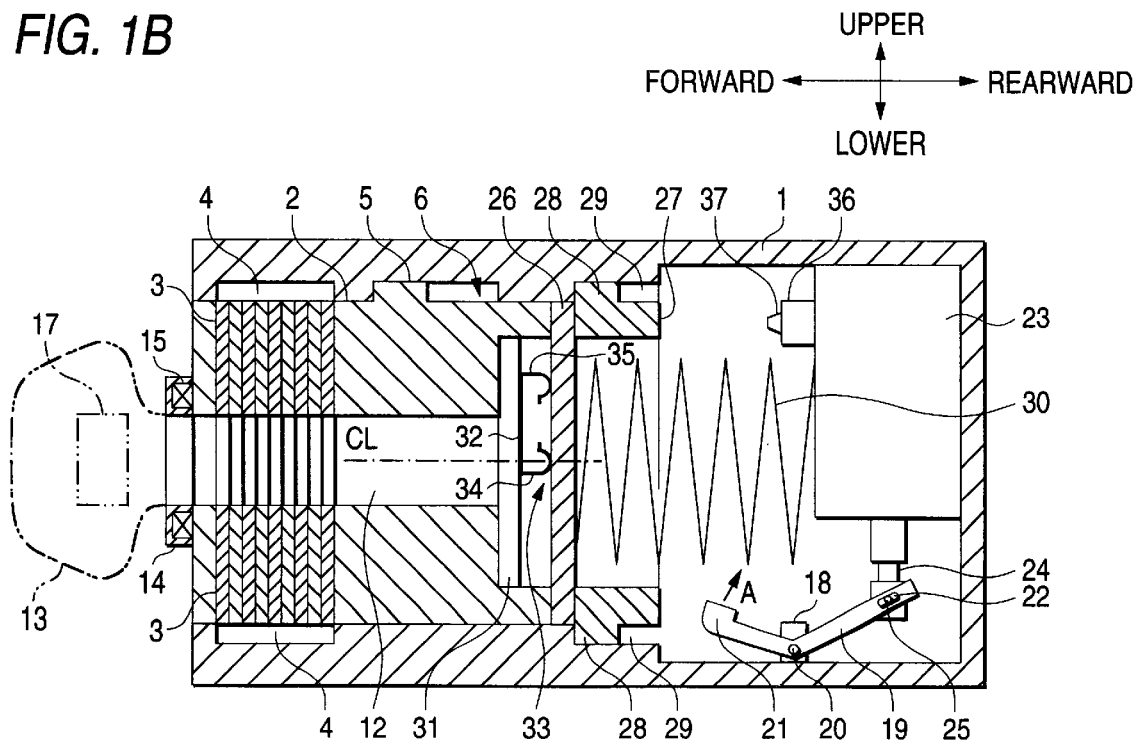

The key cylinder 2 has a hole-shaped key insertion port 12 formed thereon as shown in FIG. 1A. When a regular key 13 is inserted from the front part into the key insertion port 12 as shown in FIG. 1B, each tumbler 3 slides based on the press of a key ridge (not shown) of the key 13 and gets out of the inside of the lock groove 4.

Figure 4:
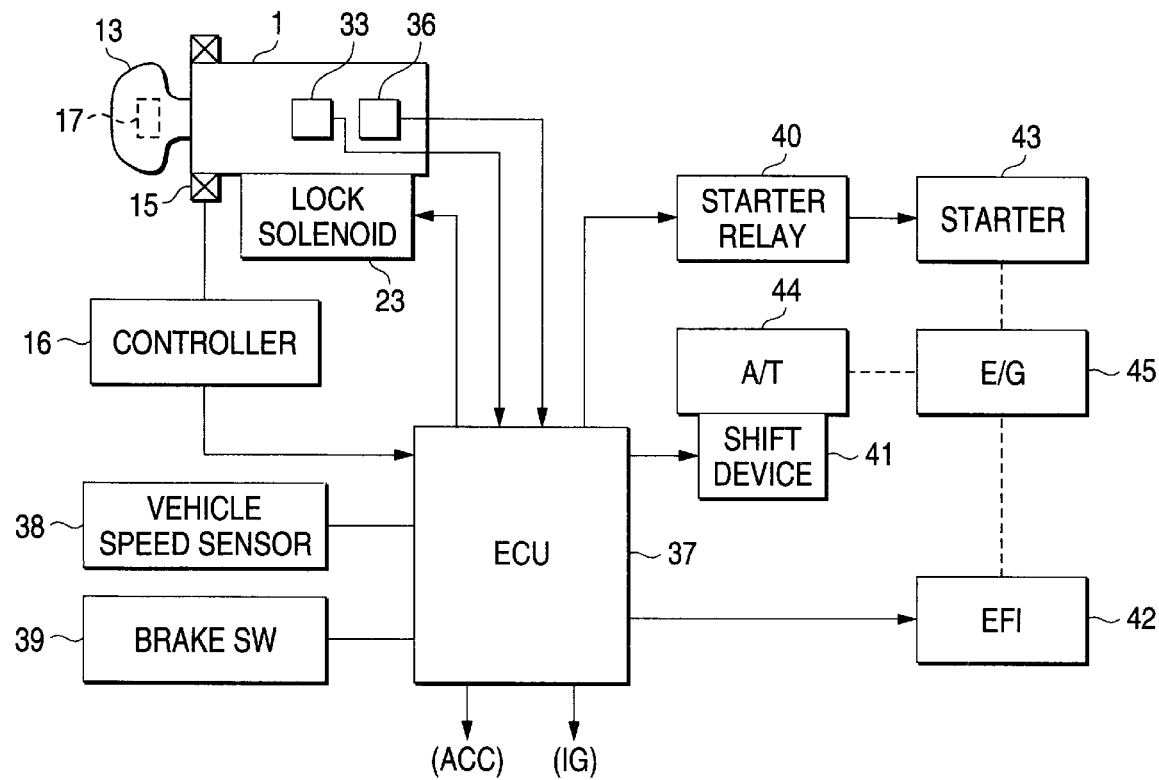
FIG. 4 is a block diagram showing an electrical structure and a mechanical structure.

An annular coil case 14 is fixed to the front face of the key cylinder 2. A primary coil 15 is accommodated in the coil case 14. The primary coil 15 is electrically connected to a vehicle controller 16 as shown in FIG. 4. The controller 16 uses a vehicle battery (not shown) as a driving power source. The controller controls an oscillation state of the primary coil 15 and cause the primary coil 15 to transmit a request signal. The controller 16 is mainly constituted by a microcomputer.

A transponder 17 provided in the key 13 has a secondary coil (not shown). The secondary coil is magnetically coupled to the primary coil 15 with a non-contact by the insertion of the key 13 in the key insertion port 12 of the key cylinder 2. The transponder 17 is mainly constituted by a microcomputer and is driven by using induced electromotive force generated by the secondary coil as a power source.

An ID code of the key 13 is recorded in an internal memory of the transponder 17.

The transponder 17 reads the ID code when the secondary coil receives the request signal from the primary coil 15, then, changes an internal impedance based on the ID code. Consequently, the oscillation state of the primary coil 15 is varied with a change in the impedance and the controller 16 reads the ID code of the key 13 based on the change in the oscillation state of the primary coil 15. The ID code 13 of the key is recorded in the internal memory of the controller 16 and the controller 16 compares an ID code transmitted from the transponder 17 with recorded data. If both of them are coincident with each other, a coincidence signal is output.

A lever bracket 18 is fixed into the switch case 1 and is positioned on a rear end as shown in FIG. 1B. A dogleg lock lever 19 is rotatably attached to the lever bracket 18 through a pin 20. A deformed stopper 21 is formed on the front end of the lock lever 19 and a slot 22 is formed on the rear end of the lock lever 19.

A lock solenoid 23 is fixedly positioned on the rear end in the switch case 1, and a plunger 24 of the lock solenoid 23 is lifted based on conduction of the lock solenoid 23 and falls based on non-conduction of the lock solenoid 23. A pin 25 is fixed to the plunger 24 and the pin 25 is inserted in the slot 22 of the lock lever 19. The pin 25 serves to transmit the kinetic force of the plunger 24 to the lock lever 19 and is held in a lock state in which the lock lever 19 is rotated in a direction of an arrow A based on the fall of the plunger 24 during the non-conduction of the lock solenoid 23.

A disk-shaped printed circuit board 26 (hereinafter referred to as a PC board 26) is fitted in the switch case 1 behind the key cylinder 2. A common contact point (not shown) is formed on the front face of the PC board 26 and is positioned on an axial core line CL of the key cylinder 2, and a plurality of position contact points (not shown) are formed in the outer peripheral portion of the common contact point.

A cylindrical bracket 27 is fitted in the switch case 1 and is fixed to the PC board 26. The bracket 27 has two guide projections 28, and the stopper 21 of the lock lever 19 is opposed to the rear end face of the bracket 27 through a clearance during the non-conduction of the lock solenoid 23.

Two guide grooves 29 are formed on the inner peripheral surface of the switch case 1 and are positioned on the rear end. The guide projection 28 of the bracket 27 is inserted into each guide groove 29. The bracket 27 can be caused to slide in a longitudinal direction because the guide projection 28 is guided to the internal wall of the guide groove 29, and cannot be rotated because the guide projection 28 is engaged with the internal wall of the guide groove 29.

A return spring 30 is provided between the lock solenoid 23 and the PC board 26. The return spring 30 is formed by a compression coil spring for urging the PC board 26 forward, and the PC board 26 is held in an advance state since both guide projections 28 of the bracket 27 come in contact with the front wall of the guide groove 29.

A contact holder 31 is fixed to the rear portion of the key cylinder 2, and a leaf spring-shaped movable contact 32 is fixed to the contact holder 31. The movable contact 32 constitutes a range switch 33 in cooperation with the PC board 26, and a common contact point 34 is formed on the movable contact 32. The common contact point 34 is provided on the axial core CL of the key cylinder 2 and stays in contact with the common contact point of the PC board 26 irrespective of the rotating position of the key cylinder 2.

A movable contact point 35 is formed on the movable contact 32. The movable contact point 35 selectively comes in contact with any of position contact points of the PC board 26 which corresponds to the rotating position of the key cylinder 2, and the movable contact 32 outputs various position signals from the PC board 26 based on the selective conduction of the position contact points of the PC board 26 to the common contact point.

A start switch 36 is fixed to the front face of the lock solenoid 23. The start switch 36 is formed by a self-reset type push switch. When a plunger 37 of the start switch 36 is pressed and operated rearward, a start signal is output from the start switch 36.

The controller 16, the range switch 33 and the start switch 36 are electrically connected to input terminals of a vehicle electronic control unit 37 (referred to as an ECU 37), and the lock solenoid 23 is electrically connected to an output terminal of the ECU 37 as shown in FIG. 4. The ECU 37 is mainly constituted by a microcomputer, and a vehicle speed sensor 38 and a brake switch 39 are electrically connected to another input terminals of the ECU 37.

The vehicle speed sensor 38 serves to output a speed signal corresponding to the running speed of an automobile and the ECU 37 serves to detect the running speed of the automobile based on a speed signal from the vehicle speed sensor 38. The brake switch 39 serves to output a brake signal based on the operation of a foot brake (not shown) of a driver's seat, and the ECU 37 serves to judge the operation state of the foot brake based on the presence of the brake signal.

A vehicle starter relay 40, a shift device 41 and an electronic fuel injection 42 (referred to as an EFI 42) are electrically connected to output terminals of the ECU 37. The starter relay 40 is electrically connected to a vehicle starter 43 and drives the starter 43 in response to a start signal from the ECU 37.

The shift device 41 serves to switch the range of a vehicle automatic transmission 44 (referred to as an A/T 44) in response to R, N and D signals from the ECU 37, and the driving force of a vehicle engine 45 is transmitted to an axle shaft (not shown) through the A/T 44. The EFI 42 serves to inject a fuel into a cylinder tube of the engine 45, and the ECU 37 calculates the amount of injection corresponding to the running state of the automobile and controls the driving operation of the EFI 42 based on the result of the calculation. The A/T 44 corresponds to an automatic transmission.

Figure 3:
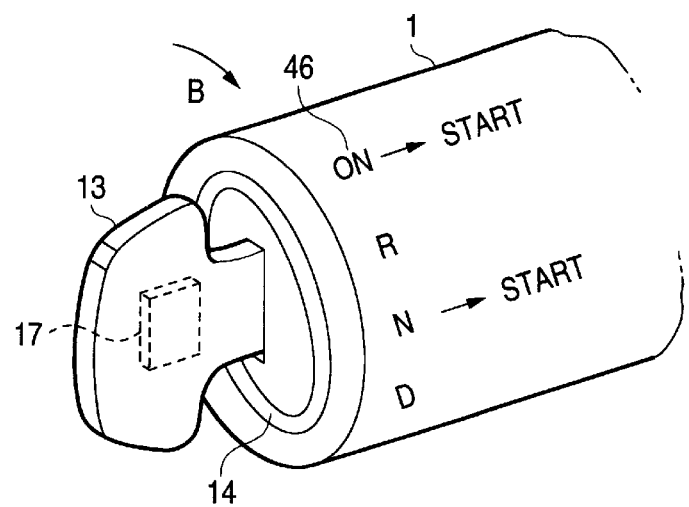
FIG. 3 is a perspective view showing the appearance of a switch device in the insertion state of the key.

Position marks 46 of "OFF", "ACC", "ON", "R", "N", "D" and "START" are provided on the outer peripheral surface of the switch case 1 as shown in FIG. 3 (the position marks 46 of "OFF" and "ACC" are not shown). When the key 13 is operated to the OFF position, the following states of (I) to (III) are set.

Figure 2:
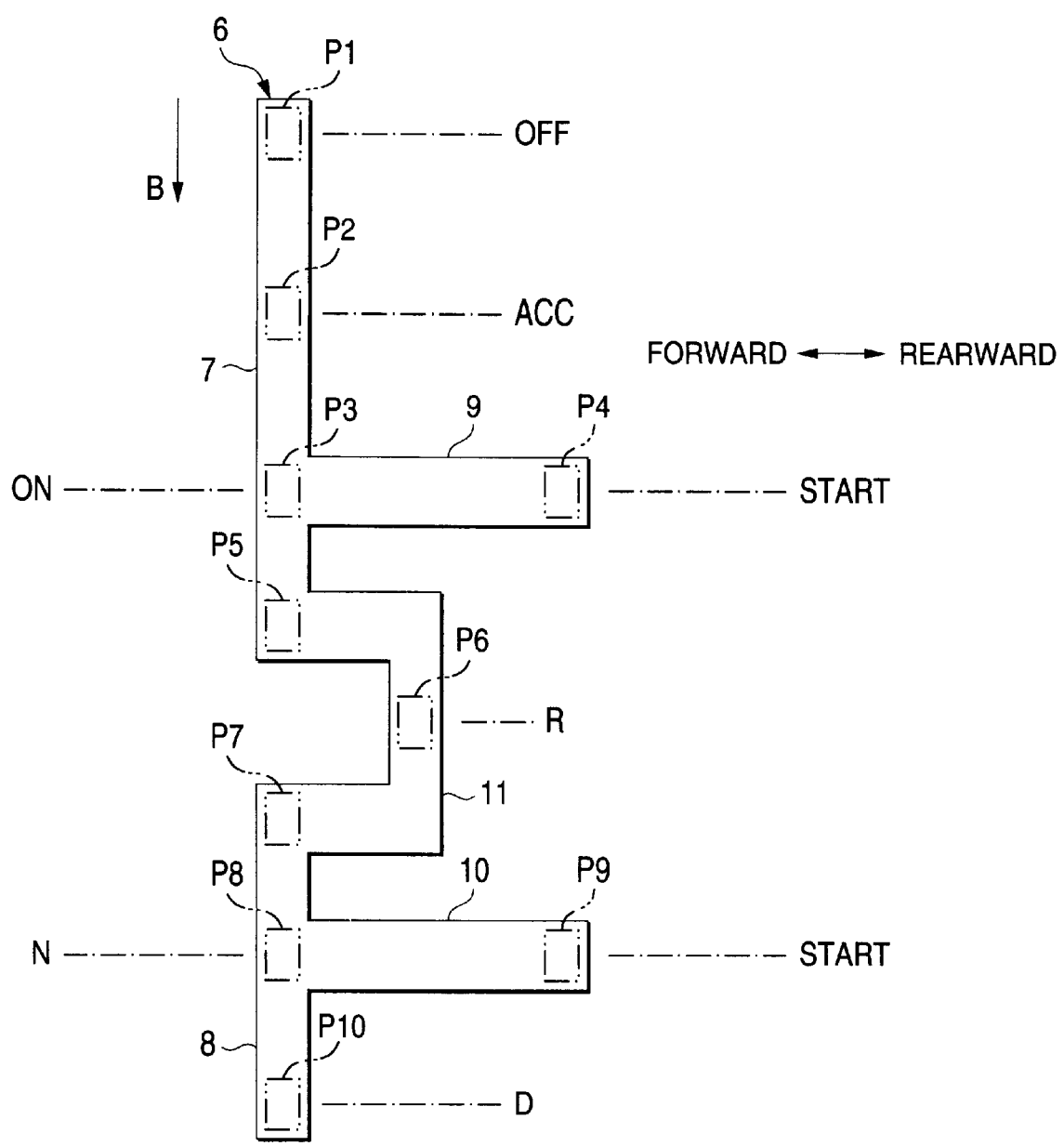
FIG. 2 is a view showing an expanded shift groove.

(I) The shift projection 5 of the key cylinder 2 is held in an OFF position P1 in the shift groove 6 as shown in a two-dotted chain line of FIG. 2, and is engaged with the front and rear walls of the shift groove 6. In addition, the tumbler 3 of the key cylinder 2 gets out of the lock groove 4 since the press through the key ridge of the key 13 and the tumbler 3 is disengaged from the lock groove 4 as shown in FIG. 1B. Accordingly, the sliding operation of the key 13 in a longitudinal direction is prohibited, and only the rotating operation of the key 13 in a direction of an arrow B is permitted.

(II) The plunger 24 is protruded downward based on the non-conduction of the lock solenoid 23, and the lock lever 19 is held in a lock state through the plunger 24 as shown in FIG. 1B.

(III) The common contact point 34 of the movable contact 32 comes in contact with the common contact point of the PC board 26, and the movable contact point 35 of the movable contact 32 comes in contact with a position contact point for the OFF position of the PC board 26. The common contact point of the PC board 26 and the position contact point for the OFF position are conducted to each other through the movable contact 32, and an OFF position signal is output from the PC board 26 to the ECU 37. In his state, the ECU 37 holds the engine 45 in a stop state.

The function of the structure will be described below. When a driver operates the key 13 from the OFF position by using the position mark 46 for identification, the following operation is executed.

<The case in which the key 13 is operated to the ACC position>

When the key 13 is rotated from the OFF position in a direction of an arrow B of FIG. 3, the key cylinder 2 is rotated integrally with the key 13. Then, the shift projection 5 of the key cylinder 2 is guided by the first rotation operating portion 7 of the shift groove 6 and is moved to the ACC position P2 as shown in a two-dotted chain line of FIG. 2.

At this time, the contact holder 31 is rotated integrally with the key cylinder 2 and the movable contact point 35 of the movable contact 32 comes in contact with the position contact point for the ACC position of the PC board 26. Consequently, the common contact point of the PC board 26 and the position contact point for the ACC position are conducted to each other so that the ACC position signal is output from the PC board 26 to the ECU 37.

When detecting the ACC position signal, the ECU 37 judges a signal output from the controller 16. When it is detected that a coincidence signal is output From the controller 16, an ACC relay (not shown) is turned ON. The ACC relay is provided on a power supply path for electrically coupling a battery and a vehicle accessory part (not shown), and power is supplied from the battery to the accessory part based on the ON operation of the ACC relay.

<The case in which the key 13 is operated to the ON position>

When the key 13 is rotated from the ACC position in the direction of the arrow B, the shift projection 5 of the key cylinder 2 is guided by the first rotation operating portion 7 of the shift groove 6 and is moved to an ON position P3 as shown in a two-dotted chain line of FIG. 2. At this time, the movable contact point 35 of the movable contact 32 comes in contact with the position contact point for the ON position of the PC board 26 and an ON position signal is output from the PC board 26 to the ECU 37.

When detecting the ON position signal, the ECU 37 turns ON a plug relay (not shown). The plug relay is provided on a power supply path for electrically coupling a battery and a spark plug (not shown), and power is supplied from the battery to the spark plug based on the ON operation of the plug relay.

When supplying the power to the spark plug, the ECU 37 judges a signal output from the brake switch 39, a signal output from the controller 16 and the state of the engine 45. When the following states a) to c) are detected, the plunger 24 is lifted based on the supply of power to the lock solenoid 23. Consequently, the stopper 21 of the lock lever 19 is rotated in a direction opposite to an arrow A as shown in FIG. 1B and is shifted toward a portion provided under the bracket 28.

a) A brake signal is output from the brake switch 39 (the driver presses the foot brake).
b) A coincidence signal is output from the controller 16 (the regular key 13 is used).
c) The engine 45 is stopped.

When the key 13 is pressed rearward from the ON position, the shift projection 5 of the key cylinder 2 is guided by the first start operating portion 9 of the shift groove 6 and is moved to a START position P4 as shown in a two-dotted chain line of FIG. 2. At this time, the guide projection 28 of the bracket 27 is guided by the guide groove 29, and the PC board 26 and the bracket 27 slide rearward.

When the bracket 27 slides rearward, the rear end face of the bracket 27 presses the rear end face of the bracket 27 and the start switch 36 outputs the start signal to the ECU 37. Consequently, the ECU 37 drives the starter 43 based on the ON operation of the starter relay 40 and the engine 45 is started based on fuel injection from the EFI 42 to the engine 45 in the forced operation state of the engine 45.

When the key 13 is released in the START position, the PC board 26 and the bracket 27 are advanced by the restoring force of the return spring 30, and the guide projection 28 of the bracket 27 stops the advance by the contact of the guide groove 29 on the front wall. At this time, the advance force of the PC board 26 is transmitted to the key cylinder 2, and the shift projection 5 of the key cylinder 2 is returned to the ON position P3.

<The case in which the key 13 is operated to an R position>

When the key 13 is rotated from the ON position in the direction of the arrow B, the movable contact point 35 of the movable contact 32 goes away from the position contact point for the ON position of the PC board 26 and the output of the ON position signal is stopped. Consequently, the ECU 37 stops the conduction of the lock solenoid 23 and the lock lever 19 is returned to the lock state by the downward protrusion of the plunger 24.

When the shift projection 5 of the key cylinder 2 is moved to a moderate position P5 which is in contact with the internal wall of the shift groove 6 as shown in a two-dotted chain line of FIG. 2, the rotating operation of the key 13 is bound. When the key 13 is pressed rearward in this state and is then rotated in the direction of the arrow B, the shift projection 5 of the key cylinder 2 is guided by the reverse operating portion 11 of the shift groove 6 and is moved to an R position P6 as shown in a two-dotted chain line of FIG. 2. At this time, the movable contact point 35 of the movable contact 32 comes in contact with the position contact point for the R position of the PC board 26 and an R position signal is output from the PC board 26 to the ECU 37.

When detecting the R position signal, the ECU 37 sends an R signal to the shift device 41 and the A/T 44 is switched to a reverse range. When the key 13 is released in the R position, the shift projection 5 of the key cylinder 2 comes in contact with the internal wall of the guide groove 6. Consequently, the shift projection 5 of the key cylinder 2 is held in the R position P6. Moreover, when the key 13 is operated in the R position, the rear end face of the bracket 27 does not reach the plunger 37 of the start switch 36 so that the start signal is held in an output stop state.

<The case in which the key 13 is operated to an N position>

When the key 13 is rotated from the R position in the direction of the arrow B and is then released, the PC board 26 and the bracket 27 are advanced by the restoring force of the return spring 30 and the guide projection 28 of the bracket 27 stops the advance by a contact with the front wall of the guide groove 29. At this time, the key cylinder 2 is returned to a non-press state based on the transmission of the advance force of the PC board 26 to the key cylinder 2, and the shift projection 5 of the key cylinder 2 is moved to a moderate position P7 which is in contact with the internal wall of the guide groove 6 as shown in a two-dotted chain line of FIG. 2.

When the key 13 is rotated in the direction of the arrow B, the shift projection 5 of the key cylinder 2 is guided by the second rotation operating portion 8 of the shift groove 6 and is moved to an N position P8 as shown in a two-dotted chain line of FIG. 2. At this time, the movable contact point 35 of the movable contact 32 comes in contact with the position contact point for the N position of the PC board 26 and an N position signal is output from the PC board 26 to the ECU 37.

When detecting the N position signal, the ECU 37 switches the A/T 44 to a neutral range based on the transmission of the N signal to the shift device 41 and switches the lock lever 19 to an unlock state based on the supply of power to the lock solenoid 23. Only in the case in which the conditions a) to c) are satisfied, the lock lever 19 is switched.

When the key 13 is pressed rearward from the N position, the shift projection 5 of the key cylinder 2 is guided by the second start operating portion 10 of the shift groove 6 and is moved to a START position P9 as shown in a two-dotted chain line of FIG. 2. At this time, the PC board 26 and the bracket 27 slide rearward and a start signal is output from the start switch 36 to the ECU 37 based on the press of the plunger 37 of the start switch 36 through the bracket 27. Consequently, the ECU 37 drives the EFI 42 and the starter 43 so that the engine 45 is started.

When the key 13 is released in the START position P9, the PC board 26, the bracket 27 and the key cylinder 2 are returned to the non-press state by the restoring force of the return spring 30.

<The case in which the key 13 is operated to a D position>

When the key 13 is rotated from the N position in the direction of the arrow B, the movable contact point 35 of the movable contact 32 goes away from the position contact point for the N position of the PC board 26 and the output of the N signal is stopped. Consequently, the ECU 37 stops the conduction of the lock solenoid 23 to move the lock lever 19 into the lock state.

When the shift projection 5 of the key cylinder 2 is guided by the second rotation operating portion 8 of the shift groove 6 and then reaches a D position P10 as shown in a two-dotted chain line of FIG. 2, the movable contact point 35 of the movable contact 32 comes in contact with the position contact point for the D position of the PC board 26 and a D position signal is output from the PC board 26 to the ECU 37. Consequently, the ECU 37 sends a D signal to the shift device 41 to switch the A/T 44 to a drive range.

While the case in which the key 13 is rotated from the OFF position in the direction of the arrow B has been described above, the same action is carried out also when the key 13 is operated in a direction opposite to the arrow B. Description will be typically given to the case in which the key 13 is moved to the OFF position based on the operation in the direction opposite to the arrow B.

<The case in which the key 13 is operated to the OFF position>

When the shift projection 5 of the key cylinder 2 is guided by the shift groove 6 and is returned to an OFF position P1 as shown in a two-dotted chain line of FIG. 2, the movable contact point 35 of the movable contact 32 comes in contact with the position contact point for the N position of the PC board 26 and the OFF position signal is output from the PC board 26 to the ECU 37. Consequently, the ECU 37 detects the operation state of the engine 45 and stops the engine 45 by stopping the spark plug and the EFI 42 during the operation of the engine 45.

According to the embodiment, the engine 45 is started based on the sliding operation of the key cylinder 2 (key 13) and the range of the A/T 44 is switched based on the rotating operation of the key cylinder 2. Therefore, when the same key cylinder 2 is operated in different directions, the operation for starting the engine 45 and the operation for switching the range of the A/T 44 can be carried out. Consequently, it is easy to carry out the operation for starting the engine 45 and the operation for switching the range of the A/T 44.

Moreover, when the key cylinder 2 (key 13) is to be rotated to the R position, it is caused to slightly slide rearward. Therefore, the key cylinder 2 can be prevented from being erroneously driven to the R position while the automobile is running. Therefore, safety can be enhanced.

Furthermore, the lock solenoid 23 is switched from the lock state to the unlock state on the condition that the brake signal is output from the brake switch 39, thereby permitting the sliding operation of the key cylinder 2 (key 13). Consequently, the engine 45 can be prevented from being started in the non-braking state of the automobile. Therefore, the safety can be enhanced.

Moreover, the lock solenoid 23 is switched from the lock state to the unlock state on the condition that the coincidence signal is output from the controller 16, thereby permitting the sliding operation of the key cylinder 2 (key 13). Consequently, the engine 45 can be prevented from being started through a wrong key 13. Therefore, the safety can be enhanced in respect of security.

While the rotating position of the key cylinder 2 has been detected through the movable contact 32 and the range switch 33 of a contact type comprising a position contact point in the embodiment, the invention is not restricted thereto but the rotating position may be detected through a range switch of a non-contact type, for example. In this case, a permanent magnet may be fixed to the key cylinder 2, a plurality of hole elements may be mounted on the PC board 26 and the permanent magnet may be opposed to the hole element corresponding to the rotating position of the key cylinder 2, hereby detecting the rotating position of the key cylinder 2.

While the key 13 can be unconditionally rotated from the OFF position in the direction of the arrow B in the embodiment, the invention is not restricted thereto but the following structure A) may be employed, for example.

A) The lock lever capable of being moved into the lock state in which the key cylinder 2 is locked to be unrotatable and the unlock state in which the rotation of the key cylinder 2 is permitted, and the lock solenoid for moving the lock lever into the lock state and the unlock state are provided in the switch case 1. Based on the insertion of the key 13 in the key cylinder 2, the ID code of the key 13 is compared with the ID code of the controller 16. Only in the case in which both of them are coincident with each other, the state of the lock solenoid is switched to bring the lock lever into the unlock state.

Moreover, while the key 13 can be unconditionally rotated from the ON position in the direction of the arrow B in the starting state of the engine 45 in the embodiment, the invention is not restricted there to but the lock lever and the lock solenoid may be provided in the switch case 1 and the lock lever may be brought into the unlock state on the condition that the brake signal is output from the brake switch 39, thereby permitting the rotating operation of the key 13, for example.

Furthermore, while the key 13 has been pushed rearward from the ON position and the N position to start the starter 44 in the embodiment, the invention is not restricted thereto but the key 13 may be pulled forward from the ON position and the N position, thereby starting the starter 44, for example.

Moreover, the key cylinder 2 corresponding to the operating member has been accommodated rotatably and slidably in the switch case 1 in the embodiment, the invention is not restricted thereto but a simple cylindrical operating member may be accommodated rotatably and slidably, for example, and the range of the A/T 44 may be switched based on the rotating operation of the operating member or the engine 45 may be started based on the sliding operation of the operating member. In this case, it is preferable that a protruded knob should be provided on the front face of the operating member and the knob should be held to rotate and slide the operating member.

While the invention has been applied to the switch device for the automobile in the embodiment, it is not restricted thereto but it may be applied to a construction vehicle, for example.

According to the switch device for a vehicle in accordance with the invention, the engine is started based on the sliding operation of the operating member and the range of the automatic transmission is switched based on the rotating operation of the operating member. Therefore, it is easy to carry out the operation for starting the engine and the operation for switching the range of the automatic transmission.

What is claimed is:

1. A switch device for a vehicle comprising:
   an operating member provided rotatably and slidably;
   a range switch for switching a range of an automatic transmission based on a rotation operation of the operating member; and
   a start switch for starting an engine based on a sliding operation of the operating member,
   wherein the operating member moves slidably when a key is completely inserted into the operating member to start the engine.

2. The switch device for the vehicle according to claim 1, wherein the operating member, the range switch and the start switch are provided in a switch case.

3. A switch device for a vehicle comprising:
   a switch case;
   an operating member provided in the switch case;
   a range switch, for switching a range of an automatic transmission based on an operation of the operating member, provided in the switch case;
   a start switch, for starting an engine based on the operation of the operating member, provided in the switch case,
   wherein the operating member moves slidably when a key is completely inserted into the operating member to start the engine.

4. The switch device for the vehicle according to claim 3, wherein the range switch switches the range of the automatic transmission when the operating member is rotatably operated, the start switch starts the engine when the operating member is slidably operated.

* * * * *